R. C. WRIGHT.
Car-Trucks.

No. 159,625. Patented Feb. 9, 1875.

WITNESSES. INVENTOR.

UNITED STATES PATENT OFFICE.

RANSOM C. WRIGHT, OF PHILADELPHIA, PENNSYLVANIA.

IMPROVEMENT IN CAR-TRUCKS.

Specification forming part of Letters Patent No. 159,625, dated February 9, 1875; application filed December 9, 1874.

*To all whom it may concern:*

Be it known that I, RANSOM C. WRIGHT, of the city of Philadelphia, State of Pennsylvania, have invented a Truck for Railways, of which the following is a specification:

The object of my invention is to construct a railway-truck that will move sidewise under the car or locomotive that it supports when they are running onto or off of a curve in the track, by allowing the center of the truck to conform to the center of the track, and thereby to gradually and easily move the end of the car or locomotive in the direction of the track, preventing the sudden shock due to a change in the direction of the track, and the tendency to move off the track at the tangent.

Figure 1:
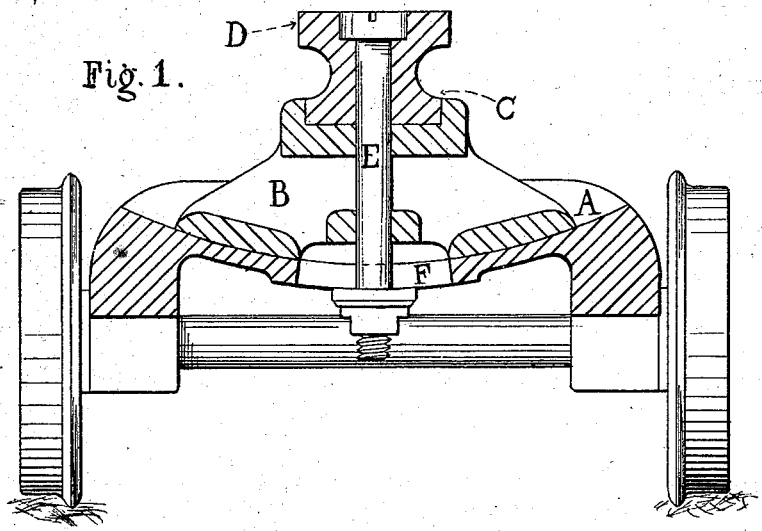
Figures 2, 3:
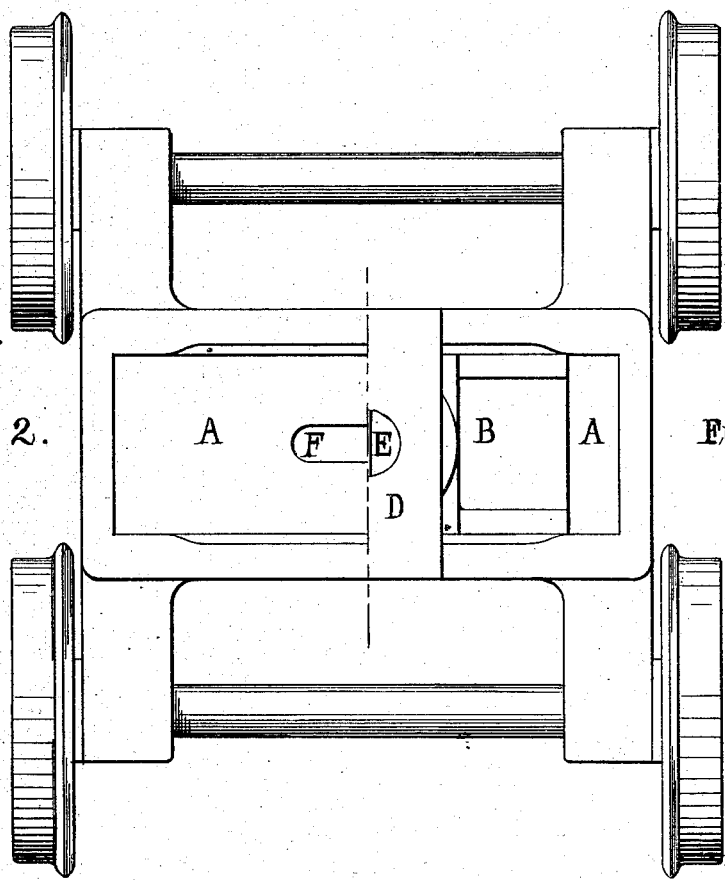

The truck is illustrated in detail by the accompanying drawings, where Figure 1 is a transverse vertical section through the center. Fig. 2 is a half plan, showing the groove A. Fig. 3 is a half plan, showing all the parts.

In the center of a truck-frame of any suitable construction is secured transversely through its center a grooved block, A, the general form of the groove being three-sided, its lower side being curvilinear in form, the center being the lowest, and rising to each side of the truck, and its front and back sides rising perpendicularly, and running parallel to each other transversely across the truck. Into the groove is placed a bridge, B, its general shape on the bottom and sides being made to conform and fit into the groove to allow it to move transversely across the truck, or the truck to move from side to side under it. On its top surface is a circular recess or pocket, C, into which the center-pin D of the car or locomotive is placed, and around which the whole truck can revolve, the truck and its bridge being held to the car or locomotive by means of a bolt, E, passed perpendicularly through the center-pin D, bridge B, grooved block A, and secured under the truck by a nut or otherwise, a slot, F, being made through the bottom of the groove, in the direction of its length, to permit of as much movement of the bridge B and bolt E in the groove as is desirable, the outer end of the bridge moving up rapidly, and the inner end moving down slowly, thereby changing the vertical central line of the bridge B to an angle from its central vertical center line, and angling the pocket C, in which rests the center-pin D, so that for the time when the car or locomotive is passing curves, the weight of the car or locomotive will be nearest the elevated end of the bridge B, therefore acting quickly and powerfully in bringing the truck to a central position on entering straight track.

It will be evident that the concavity of the lower side of the groove A may be different in different trucks, should it be required.

I am aware that a truck moving transversely, by means of planes of fixed inclination, on which the bridge rises parallel, without unseating the center-pin, is not new; but

I claim as my invention, and desire to secure by Letters Patent—

The combination of the grooved block A and bridge B, substantially as and for the purpose set forth.

RANSOM C. WRIGHT.

Witnesses:
R. H. SANFORD,
WM. L. AUSTIN.